(12) United States Patent
Skiera et al.

(10) Patent No.: US 11,618,400 B2
(45) Date of Patent: Apr. 4, 2023

(54) METHOD AND DEVICE FOR MONITORING A MOTORCYCLE

(71) Applicant: Robert Bosch GmbH, Stuttgart (DE)

(72) Inventors: Alexander Skiera, Weil der Stadt (DE); Florian Mayer, Ditzingen (DE); Markus Henzler, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 131 days.

(21) Appl. No.: 17/256,616

(22) PCT Filed: Sep. 24, 2018

(86) PCT No.: PCT/EP2018/075761
§ 371 (c)(1),
(2) Date: Dec. 28, 2020

(87) PCT Pub. No.: WO2020/064079
PCT Pub. Date: Apr. 2, 2020

(65) Prior Publication Data
US 2021/0268982 A1    Sep. 2, 2021

(51) Int. Cl.
*B60W 40/107* (2012.01)
*B60R 21/0132* (2006.01)

(52) U.S. Cl.
CPC ....... *B60R 21/0132* (2013.01); *B60W 40/107* (2013.01); *B60W 2300/36* (2013.01)

(58) Field of Classification Search
CPC ........ B60R 21/0132; B60R 2021/0027; B60R 2021/01327; B60R 2021/0018;
(Continued)

(56) References Cited

U.S. PATENT DOCUMENTS 5,593,111 A * 1/1997 Jackson ................... B62J 27/00
244/113
6,315,074 B1 * 11/2001 Achhammer ......... B60R 21/013
180/282
(Continued)

FOREIGN PATENT DOCUMENTS

CN    1177549 A * 4/1998    ......... B60R 21/0132
CN    1927639 A    3/2007
(Continued)

OTHER PUBLICATIONS

"A Novel Crash Detection Algorithm for Two-Wheeled Vehicles;" Gelmini et al., IEEE Transactions on Intelligent Vehicles (vol. 6, Issue: 1, pp. 88-99); Mar. 1, 2021. (Year: 2021).*
(Continued)

*Primary Examiner* — Khoi H Tran
*Assistant Examiner* — Jorge O Peche
(74) *Attorney, Agent, or Firm* — Norton Rose Fulbright US LLP; Gerard Messina

(57) ABSTRACT

A method and an apparatus for monitoring a motorcycle. Based on the acceleration-relevant data, a vehicle motion and a vehicle position in three-dimensional space are estimated. The vehicle position in space is analyzed and is evaluated as a normal or a critical riding state. A detection direction of a sensor unit is predefined in such a way that in an upright normal resting position of the motorcycle the detection direction lies in a horizontal plane, and the detected acceleration-relevant data encompass a first acceleration component in a longitudinal vehicle direction and a second acceleration component in a transverse vehicle direction. A riding state evaluated as critical is plausibilized with the estimated vehicle motion in order to recognize a critical resting position after an accident. An emergency call is
(Continued)

generated when a critical resting position after an accident is recognized.

14 Claims, 6 Drawing Sheets

(58) Field of Classification Search
CPC ........ B60R 2021/0088; B60W 40/107; B60W 2300/36; B62J 27/00; B62J 45/4151
See application file for complete search history.

(56) References Cited

U.S. PATENT DOCUMENTS

| | | | |
|---|---|---|---|
| 2010/0039216 A1 | 2/2010 | Knight et al. | |
| 2010/0079266 A1* | 4/2010 | Holt | B62J 45/4151 340/436 |
| 2010/0302029 A1* | 12/2010 | Emmerich | B62H 5/20 340/539.13 |
| 2014/0070931 A1 | 3/2014 | Savaresi et al. | |
| 2018/0030910 A1* | 2/2018 | Roch | B60C 23/0488 |
| 2018/0241425 A1 | 8/2018 | Chavez | |
| 2020/0055475 A1* | 2/2020 | Mayer | H04W 4/90 |
| 2021/0268982 A1* | 9/2021 | Skiera | B62J 45/4151 |

FOREIGN PATENT DOCUMENTS

| | | | | |
|---|---|---|---|---|
| CN | 101638096 A | * | 2/2010 | .......... B60W 40/107 |
| CN | 107407561 A | * | 11/2017 | .......... B60C 23/006 |
| CN | 107921960 A | | 4/2018 | |
| CN | 113825689 A | * | 12/2021 | ............ B60W 40/09 |
| DE | 19720622 A1 | * | 1/1998 | ............. B60R 21/16 |
| DE | 10247120 A1 | * | 6/2004 | ............. B60R 21/16 |
| DE | 102008004307 A1 | | 8/2008 | |
| DE | 102012220355 A1 | | 5/2014 | |
| DE | 102012220355 A1 | * | 5/2014 | ................ B60T 7/12 |
| DE | 102015207330 A1 | * | 10/2016 | ............ B60W 30/08 |
| DE | 102016205544 A1 | * | 3/2017 | |
| DE | 102017205063 A1 | * | 9/2018 | |
| DE | 102018202664 A1 | * | 8/2019 | |
| DE | 102020204460 A1 | * | 10/2021 | |
| DE | 102021202529 A1 | * | 9/2022 | |
| EP | 1184233 A1 | * | 3/2002 | ......... B60R 21/0132 |
| EP | 1184233 A1 | | 3/2002 | |
| EP | 1118507 B1 | * | 5/2004 | .......... B60R 21/013 |
| FR | 2899690 A1 | * | 10/2007 | .......... G01P 15/0888 |
| JP | 2009073492 A | | 4/2009 | |
| JP | 2014129623 A | | 7/2014 | |
| JP | 2017045854 A | | 3/2017 | |
| JP | 2018118341 A | | 8/2018 | |
| KR | 100474180 B1 | * | 3/2005 | |
| RU | 2314216 C2 | * | 1/2008 | |
| WO | WO-9950103 A1 | * | 10/1999 | .......... B60R 21/013 |
| WO | WO-0216169 A1 | * | 2/2002 | ......... B60R 21/0132 |
| WO | WO-0234579 A1 | * | 5/2002 | ......... B60R 21/0132 |
| WO | 2010003715 A1 | | 1/2010 | |
| WO | WO-2010149149 A2 | * | 12/2010 | ......... B60G 17/0157 |
| WO | WO-2012062509 A1 | * | 5/2012 | ............ B60T 8/1706 |
| WO | WO-2012079805 A1 | * | 6/2012 | .......... B60R 21/013 |
| WO | 2013118432 A1 | | 8/2013 | |
| WO | WO-2015197416 A1 | * | 12/2015 | .............. B62J 27/00 |
| WO | WO-2016107846 A1 | * | 7/2016 | ................ A61B 5/11 |
| WO | 2018149600 A1 | | 8/2018 | |
| WO | 2018225426 A1 | | 12/2018 | |
| WO | WO-2019072878 A1 | * | 4/2019 | |
| WO | WO-2020064079 A1 | * | 4/2020 | ......... B60R 21/0132 |

OTHER PUBLICATIONS

"Intersection Support System for Powered Two-Wheeled Vehicles: Threat Assessment Based on a Receding Horizon Approach;" Biral et al.; IEEE Transactions on Intelligent Transportation Systems (vol. 13, Issue: 2, pp. 805-816); Jul. 1, 2012. (Year: 2012).*
"Analysis and development of an automatic eCall for motorcycles: a one-class cepstrum approach;" Gelmini et al., 2019 IEEE Intelligent Transportation Systems Conference (ITSC) (pp. 3025-3030); Jan. 17, 2020. (Year: 2020).*
International Search Report for PCT/EP2018/075761, dated Jun. 18, 2019.

* cited by examiner

Y-Axis

Z-Axis

METHOD AND DEVICE FOR MONITORING A MOTORCYCLE

FIELD

The present invention relates to a method for monitoring a motorcycle. An apparatus for monitoring a motorcycle, as well as a motorcycle having such an apparatus, are also provided in accordance with the present invention.

BACKGROUND INFORMATION

Acceleration-based triggering methods for safety systems for motorcycle riders are conventional in the related art. Activation of a safety system to protect a motorcycle rider can occur on the basis of acceleration signals that can be ascertained by corresponding sensor units on the motorcycle and/or on the rider and/or on the rider's clothing. Safety functions of such a safety system can encompass, for example, triggering of a restraint system, for example an airbag, or of an emergency call system that transmits an emergency call if an accident has occurred. In addition, for example, a braking intervention can be performed by way of a rider assistance system.

The methods described in the related art contain substantially a technical implementation using signal values of the angular velocity. Methods in which the use of acceleration sensors is discussed are also described.

European Patent No. EP 1 184 233 B1, for example, describes an apparatus for detecting operating states of a motorcycle, which apparatus has an electronic control unit and an acceleration sensor that is installed in the electronic control unit. The apparatus described is said to detect that the motorcycle has fallen, or has fallen and collided, the acceleration sensor being disposed on the motorcycle substantially in such a way that in an upright normal resting position, a corresponding detection direction of the acceleration sensor is oriented in a transverse vehicle direction or in a vertical vehicle direction, and thereby detects and analyzes the acceleration of gravity.

SUMMARY

A method and apparatus for monitoring a motorcycle in accordance with example embodiments of the present invention may have the advantage that the recognition and evaluation of riding states is based on only one acceleration sensor at an arbitrary installation location. In contrast to the related art, the use of further signals or sensors, for example angular velocities, can be omitted. In addition, acceleration-relevant data of a sensor already installed on the motorcycle can be analyzed, so that embodiments of the present invention can be implemented particularly simply.

Embodiments of the present invention are capable of estimating and evaluating different riding situations of a motorcycle. The focus here is on distinguishing between a pre-crash situation and a post-crash situation, and optionally a crash situation. The riding situations can be plausibilized by way of a logic block and can be utilized for different triggering strategies, for example to trigger an emergency call system.

Embodiments of the present invention make available a method for monitoring a motorcycle which detects and analyzes acceleration-relevant data of the motorcycle. Based on the acceleration-relevant data and/or on variables ascertained therefrom, a vehicle motion and a vehicle position in three-dimensional space are estimated, the currently estimated vehicle position in space being analyzed and being evaluated as a normal or a critical riding state. A detection direction of a sensor unit is predefined here in such a way that in an upright normal resting position of the motorcycle the detection direction lies in a horizontal plane, and the detected acceleration-relevant data encompass a first acceleration component in a longitudinal vehicle direction and a second acceleration component in a transverse vehicle direction. A riding state evaluated as critical is plausibilized with the estimated vehicle motion in order to recognize a critical resting position after an accident, and an emergency call is generated after an accident when a critical resting position is recognized.

An apparatus for monitoring a motorcycle is furthermore provided in accordance with an example embodiment of the present invention, which apparatus encompasses a sensor unit and an analysis and control unit, and is configured to execute the method(s) according to the present invention. The sensor unit detects the acceleration-relevant data of the motorcycle and outputs them to the analysis and control unit, which analyzes the acceleration-relevant data and ascertains and evaluates a current riding state.

Also provided in accordance with an example embodiment of the present invention is a motorcycle having such an apparatus for monitoring a motorcycle, and having an emergency call apparatus. The emergency call apparatus transmits the emergency call generated by the analysis and control unit.

The "motorcycle" can be understood in the present case as a two-wheeled vehicle having a propulsion system. The propulsion system can be a combustion engine or an electric motor or a combination of combustion engine and electric motor. Embodiments of the present invention can also be used for electric bicycles or pedelecs.

The "analysis and control unit" can be understood in the present case as an electrical device, for example a control device, that processes or analyzes detected sensor signals. The analysis and control unit can have at least one interface that can be embodied on a hardware and/or software basis. With a hardware-based embodiment, the interfaces can be, for example, part of a so-called system ASIC that contains a wide variety of functions of the analysis and control unit. It is also possible, however, for the interfaces to be dedicated integrated circuits, or to be made up at least in part of discrete components. With a software-based embodiment, the interfaces can be software modules that are present, for example, on a microcontroller alongside other software modules. Also advantageous is a computer program having program code, which is stored on a machine-readable memory medium such as a semiconductor memory, a hard-drive memory, or an optical memory, and is used to carry out the analysis when the program is executed by the analysis and control unit.

A "vehicle position" can be understood in the present case as the orientation of the motorcycle in three-dimensional space. The present invention is based on the recognition that the vehicle position can be estimated based on acceleration-relevant data of the motorcycle, i.e., data that describe the accelerations acting on the motorcycle, or on variables ascertained from the acceleration-relevant data. A resulting acceleration datum can thus be determined from the acceleration-related data or from variables ascertained therefrom, and calibrated against the acceleration of the earth, i.e., the force of gravity. That calibration can result, for example, in angles with respect to a vehicle coordinate system, which can describe the vehicle position in three-dimensional space.

The present invention is further based on the recognition that on the basis of the vehicle position, the riding state of the motorcycle can be determined and can be divided at least into categories of "normal" and "critical." The division can be effected, for example, by way of regions with reference to the vehicle coordinate system. Three axes are typically assumed for this: the longitudinal vehicle axis (X axis), which extends substantially in the longitudinal vehicle direction; the transverse vehicle axis (Y axis), which extends orthogonally to the X axis transversely to the longitudinal vehicle direction; the vertical vehicle axis (Z axis), which extends orthogonally to the X axis and the Y axis.

The origin point of the vehicle coordinate system is typically located at the vehicle's center of gravity. If the sensor that detects the forces acting on the motorcycle is not also located at the vehicle's center of gravity, a suitable transformation of the detected acceleration-relevant data, or of variables derived therefrom, can then be carried out.

The regions can be indicated in such a way that on the one hand, based on empirical investigations and physical conditions, they cover the angles within which a motorcycle can maintain itself in stable fashion at a standstill, and on the other hand they cover implausible positions. An implausible position can be regarded, for example, as a motorcycle that is upside down, or a motorcycle that comes to rest in an implausible position on the front or rear wheel.

Features and refinements described herein make possible advantageous improvements and refinements of the method in accordance with the present invention and to the apparatus in accordance with the present invention.

It is particularly advantageous that the currently estimated vehicle position in space can be evaluated as a normal riding state if the vehicle position lies within a defined region. Alternatively, the currently estimated vehicle position can be evaluated as a critical riding state if the vehicle position lies outside the defined region. A riding state evaluated as critical can be plausibilized, and the critical resting position after an accident can be inferred, if no change in the vehicle motion can be detected in the context of a time-related threshold value consideration over a defined time period. An example of this would be a motorcycle lying on its side.

In an advantageous embodiment of the method for monitoring a motorcycle in accordance with the present invention, an existence of a collision can be assessed based on the acceleration-relevant data and/or on variables ascertained therefrom. The existence of a collision can be inferred, and an emergency call can be generated, if the acceleration-relevant data and/or variables ascertained therefrom exceed a predefined threshold value in the context of a time-related threshold value consideration over a defined time period. For example, the filtered acceleration-relevant data can be analyzed as further variables.

In a further advantageous embodiment of the apparatus for monitoring a motorcycle in accordance with the present invention, the analysis and control unit can generate the emergency call and transmit it via a communication unit. Alternatively, the analysis and control unit can output the ascertained critical or non-critical state to the communication unit, which can then generate and transmit the emergency call. Transfer of the signals from the sensor unit to the analysis and control unit, or from the processing analysis and control unit to the communication unit, can take place in wire-based fashion electronically, optically, or mechanically, and wirelessly, for instance, via Bluetooth.

In a further advantageous embodiment of the apparatus for monitoring a motorcycle in accordance with the present invention, the analysis and control unit can encompass a state estimator that can assess the vehicle position in three-dimensional space and/or the vehicle motion and/or the existence of a collision.

In a further advantageous embodiment of the apparatus for monitoring a motorcycle in accordance with the present invention, the analysis and control unit can filter the acceleration-relevant data through at least one filter unit, and ascertain the further variables.

Exemplifying embodiments of the present invention are depicted in the figures and will be explained in further detail in the description that follows. In the figures, identical reference characters refer to components or elements that perform identical or analogous functions.

DETAILED DESCRIPTION OF EXAMPLE EMBODIMENTS

Figure 1:
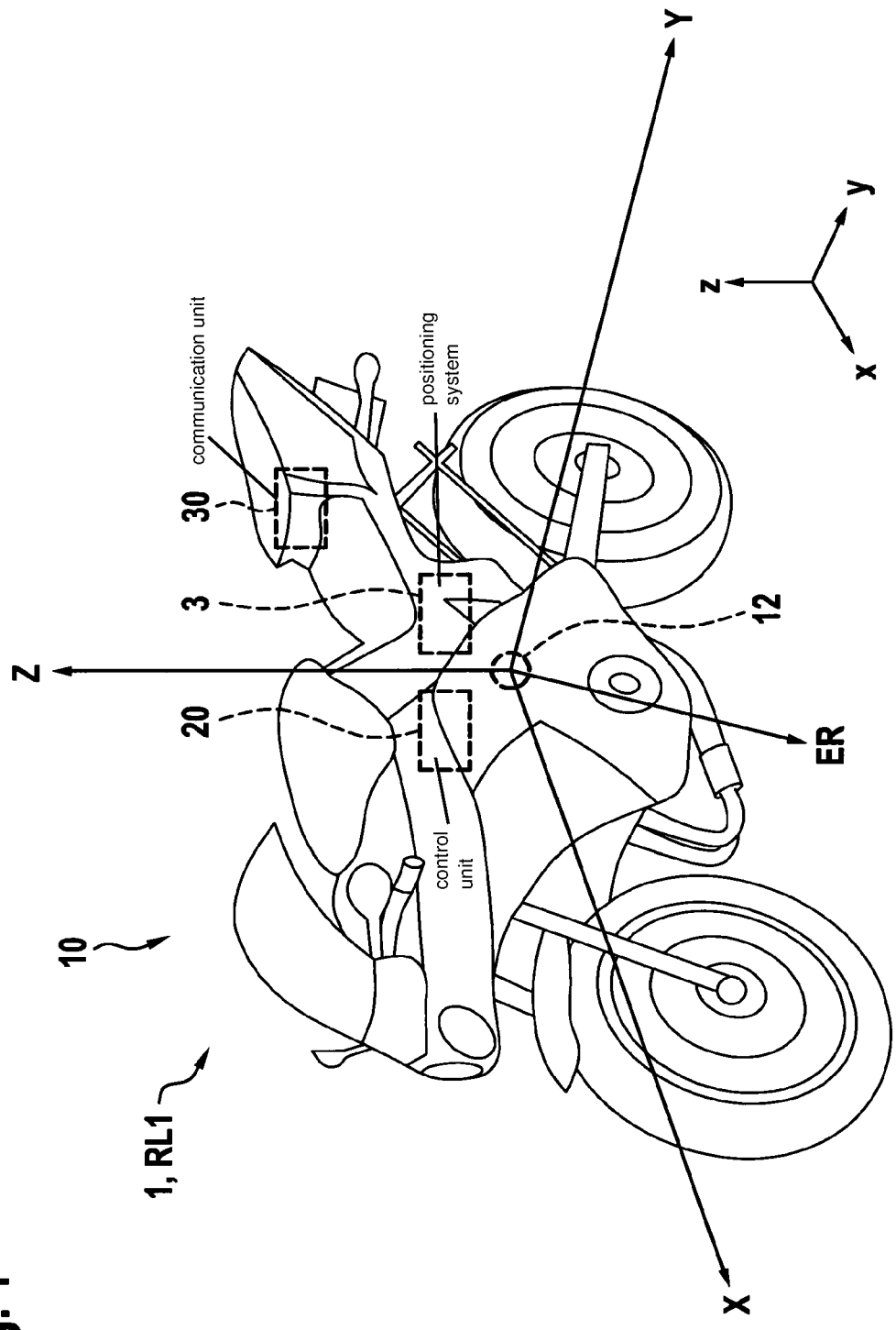
FIG. 1 is a schematic perspective depiction of a motorcycle in an upright resting position, having an exemplifying embodiment of an apparatus according to an example embodiment of the present invention for monitoring a motorcycle.
Figure 2:
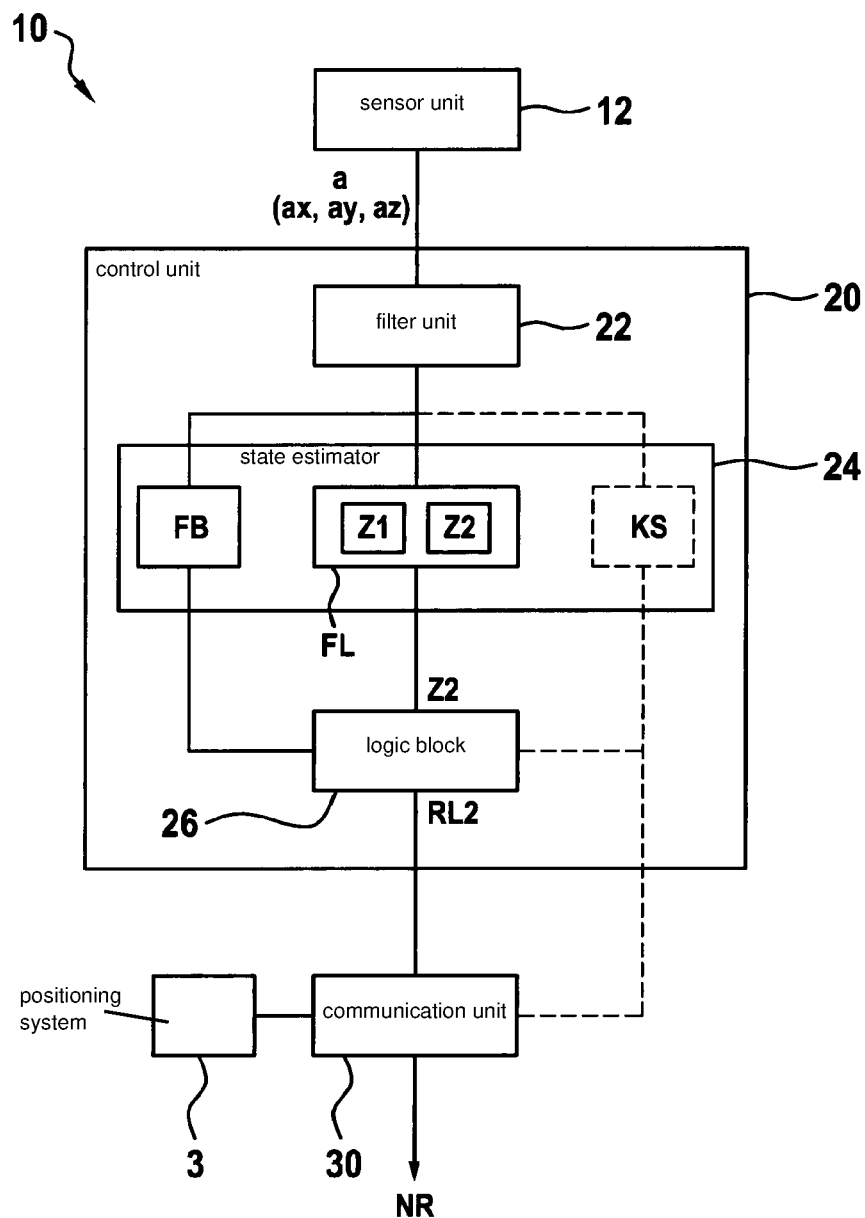
FIG. 2 is a schematic block diagram of an exemplifying embodiment of an apparatus according to the present invention for monitoring a motorcycle.

As is shown in FIGS. 1 and 2, motorcycle 1 that is depicted encompasses an apparatus 10 for monitoring a motorcycle 1, and an emergency call apparatus 30. Emergency call apparatus 30 transmits an emergency call NR that is generated by apparatus 10 for monitoring a motorcycle 1.

As is further evident from FIGS. 1 and 2, apparatus 10 for monitoring a motorcycle 1 encompasses, in the exemplifying embodiment depicted, a sensor unit 12 and an analysis and control unit 20. Sensor unit 12 detects acceleration-relevant data a, ax, ay, az of motorcycle 1 and outputs them to analysis and control unit 20, which analyzes acceleration-relevant data a, ax, ay, az and ascertains and evaluates a current riding state Z1, Z2. Apparatus 10 for monitoring a motorcycle 1 is configured to execute a method, depicted in FIG. 3, for monitoring a motorcycle 1. Sensor unit 12 is preferably installed above the sprung mass of motorcycle 1, i.e., above the swing arm and the fork legs.

As is further evident from FIGS. 1 and 2, a detection direction ER of sensor unit 12 is predefined so that in the upright normal resting position RL1 of motorcycle 1 as depicted, a detection direction ER lies in a horizontal plane x-y, and the detected acceleration-relevant data a, ax, ay encompass a first acceleration component ax in a longitudinal vehicle direction X and a second acceleration component ay in a transverse vehicle direction Y. Detection direction ER is at an angle, for example in the range from 30 to 60°, preferably an angle of 45°, with respect to transverse vehicle direction Y. In addition to detection direction ER, sensor unit 12 encompasses a second detection direction that encompasses third acceleration component az in vertical vehicle direction Z. In a preferred embodiment, sensor device 12 can have further detection directions. The first, second, and further detection directions can be oriented orthogonally to one another. Sensor unit 12 thus detects acceleration-relevant data a, ax, ay, az of motorcycle 1 and outputs them to analysis and control unit 20. In the exemplifying embodiment depicted, analysis and control unit 20 encompasses a filter unit 22 that filters acceleration-relevant data a, ax, ay, az and makes the further variables available for analysis. For example, the filtered acceleration-relevant data a, ax, ay, az can be analyzed as further variables. Analysis and control unit 20 furthermore encompasses a state estimator 24 that, based on acceleration-relevant data a, ax, ay, az and/or on variables ascertained therefrom, estimates in a first block the vehicle motion FB, and in a second block the vehicle position FL in three-dimensional space. In addition, in the second block the currently estimated vehicle position FL in space is analyzed and is evaluated as a normal or critical riding state Z1, Z2. In particular, motions via the roll axis (X axis) and the pitch axis (Y axis) can be ascertained by way of the detected acceleration-relevant data a, ax, ay, az and/or variables ascertained therefrom. Motions via the yaw axis (Z axis) can also be ascertained. The vehicle position FL can be estimated in particular by way of the motions via the roll axis and pitch axis. Analysis and control unit 20 evaluates the currently estimated vehicle position FL in space as a normal riding state Z1 if the vehicle position FL lies within a defined region. Alternatively, analysis and control unit 20 evaluates the currently estimated vehicle position as a critical riding state Z2 if the vehicle position FL lies outside the defined region. The regions can be indicated as acceleration limit values in the direction of the observed vehicle axes, or as angles with respect to the force of gravity. Analysis and control unit 20 plausibilizes a riding state Z2 evaluated as critical, in a logic block 26, with the estimated vehicle motion FB in order to recognize a critical resting position RL2 after an accident. Analysis and control unit 20 infers a resting position RL when no change in the vehicle motion FB is detected in the context of a time-related threshold value consideration over a defined time period. If a recognized resting position coincides with an estimated vehicle position FL evaluated as critical, analysis and control unit 20 then plausibilizes a critical resting position RL2 after an accident. When a critical resting position RL2 after an accident is recognized, an emergency call NR is generated, and is transmitted or sent via communication unit 30. In the exemplifying embodiment depicted, motorcycle 1 encompasses a positioning system 3 that determines a current location of motorcycle 1. That location can be transmitted along with emergency call NR or sent to a central emergency call center.

In the context of the present invention, the conditions below have proven to be critical vehicle positions FL for estimating the vehicle position FL on the basis of acceleration-relevant data a, ax, ay, az.

If $a_y$ is an acceleration-relevant datum in the direction of the Y axis, indicated in [G], and $a_z$ is an acceleration-relevant datum in the direction of the Z axis, indicated in [G], then:

$$(a_y \mid a_z) \begin{cases} 0.7 < a_y < 1.15 [G] \\ -1.15 < a_z < 0.35 [G] \end{cases}$$

As is further evident from FIG. 2, in the exemplifying embodiment depicted state estimator 24 carries out, in a block depicted with dashed lines, a collision estimation function KS. Analysis and control unit 20 infers the existence of a collision K, and generates emergency call NR, if acceleration-relevant data a, ax, ay, az and/or variables ascertained therefrom exceed at least one predefined threshold value in the context of a time-related threshold value consideration over a defined time period. In addition, the result of the collision estimate can be used when evaluating the riding state in logic block 26.

Figure 3:
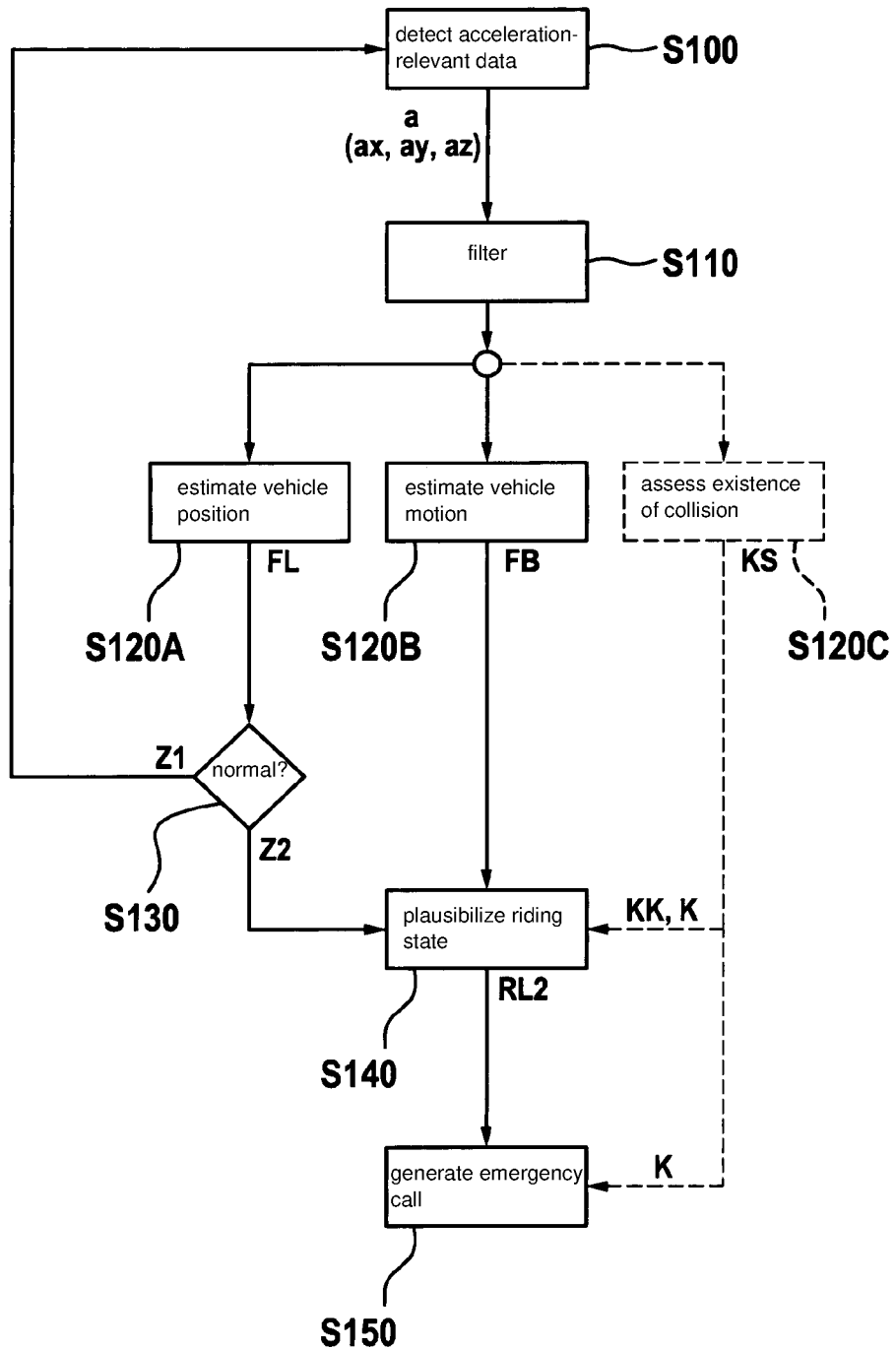
FIG. 3 is a schematic flow chart of an exemplifying embodiment of a method according to the present invention for monitoring a motorcycle.

As is further evident from FIG. 3, in a step S100 the method for monitoring a motorcycle 1 detects acceleration-relevant data a, ax, ay, az of the motorcycle. Detection direction ER of sensor unit 12 is predefined in such a way that in an upright normal resting position RL1 of motorcycle 1, detection direction ER lies in a horizontal plane x-y, and the detected acceleration-relevant data a, ax, ay, az encompass a first acceleration component ax in a longitudinal vehicle direction X and a second acceleration component ay in a transverse vehicle direction Y. In the exemplifying embodiment depicted, acceleration-relevant data a, ax, ay, az are filtered in a step S110. In a step S120A, based on acceleration-relevant data a, ax, ay, az and/or on variables ascertained therefrom, the vehicle position FL in three-dimensional space is estimated. In a step S120B, a vehicle motion FB is estimated based on acceleration-relevant data a, ax, ay, az and/or on variables ascertained therefrom. In the exemplifying embodiment depicted, steps S120A and S120B are executed in parallel. In an alternative exemplifying embodiment that is not depicted, steps S120A and S120B are executed successively. In step S130, the currently estimated vehicle position FL in space is analyzed and is evaluated as a normal or a critical riding state Z1, Z2. The currently estimated vehicle position FL in space is evaluated as a normal riding state Z1 if vehicle position FL lies within a defined region. Alternatively, the currently estimated vehicle position is evaluated as a critical riding state Z2 if vehicle position FL lies outside the defined region, the region being indicated as acceleration limit values in the direction of the observed vehicle axes, or as axes with respect to the force of gravity. If the analysis yields a normal riding state Z1, the method then returns to step S100. If the analysis yields a critical riding state Z2, the riding state Z2 evaluated as critical is then, in a step S140, plausibilized with the estimated vehicle motion FB from step S120B in order to recognize a critical resting position RL2 after an accident. Analysis and control unit 20 infers a resting position RL if no change in vehicle motion FB is detected in the context of a time-related threshold value consideration over a defined time period. If a recognized resting position coincides with an estimated vehicle position FL evaluated as critical, analysis and control unit 20 plausibilizes a critical resting position RL2 after an accident. If the recognized critical resting position RL2 after an accident is evaluated as plausible, an emergency call NR is then generated and outputted in step S150.

In the exemplifying embodiment depicted, in step S120C depicted with dashed lines an existence of a collision K can optionally be assessed based on acceleration-relevant data a, ax, ay, az and/or on variables ascertained therefrom. In the exemplifying embodiment depicted, step S120C is executed in parallel with steps S120A and S120B. The result of the collision assessment can be used in logic block 26 to plausibilize the recognized critical riding state Z2. In step S120C, the existence of a collision K is inferred, and in step S150 an emergency call NR is generated, if acceleration-relevant data a, ax, ay, az and/or variables ascertained therefrom exceed at least a predefined threshold value in the context of a time-related threshold value consideration over a defined time period.

The method for monitoring a motorcycle 1 can be implemented, for example, in software or hardware or in a mixed form of software and hardware, for example in a control device or in analysis and control unit 20.

Embodiments of the present invention are capable of estimating and evaluating different riding situations of motorcycle 1. Acceleration-relevant data a, ax, ay, az of the real riding state are measured and are filtered via filter unit 22, which encompasses, e.g., a lowpass filter, for further processing. The filtered signals are further processed in analysis and control unit 20, which is installed in a different installation location than sensor unit 12, by the various blocks of state estimator 24. An estimate of vehicle motion FB is made on the basis of the dynamics of the filtered measured signals. A collision estimation function KS takes place on the basis of the signal values of horizontal plane x-y. The collision recognition is implemented by applying a time-related threshold value consideration. An estimate of the vehicle position FL in space takes place based on the signal values of the measured signals. The resting position recognition is implemented by using a time-related threshold value consideration. States Z1, Z2 outputted by the blocks of state estimator 24 are plausibilized via a logic test in logic block 26, thereby enabling a reliable estimate of the riding state or riding situation. Transfer of the signals from sensor unit 12 to analysis and control unit 20, or from the processing analysis and control unit 20 to communication unit 30, can take place in wire-based fashion electronically, optically, or mechanically, and wirelessly, for instance, via Bluetooth.

If analysis and control unit 20 recognizes, by way of the estimate of the vehicle position FL in space, that motorcycle 1 is in a position outside the defined region, state estimator 24 transmits a corresponding signal to logic block 26, which is embodied, e.g., as a state machine. In order to plausibilize that estimate, recourse is had to the estimate of an existing vehicle motion FB, which is inputted into logic block 26. If, for a defined time period, no detected vehicle motion FB exists, simultaneously with an estimate of a vehicle position FL in space which lies outside the defined boundaries, an accident, or a motorcycle having a critical resting position, is then inferred. One example thereof would be a motorcycle lying on its side.

If collision estimation function KS recognizes a threshold exceedance of acceleration-relevant data a, ax, ay, az over a defined time period, a collision K with another vehicle or object can be assumed. This situation is sufficiently unequivocal that further plausibilization in logic block 26 can be omitted. When a collision K is recognized, the possibility exists of transmitting emergency call NR directly, without recognition of a resting position RL2 after an accident. The time elapsed until the arrival of emergency personnel can thereby be further shortened. It is furthermore possible to deal with special situations in which, for example, motorcycle 1 remains stuck upright in the collision partner. Alternatively, the results K, KK of collision estimation function KS in logic block 26 can contribute to increased reliability and can serve as additional data when an emergency call NR is transferred, in order to convey to emergency personnel not only the position but also the nature of the accident.

FIGS. 4a to 4d show examples of normal (4a, 4b) and critical (4c, 4d) vehicle positions.

Figure 4A:
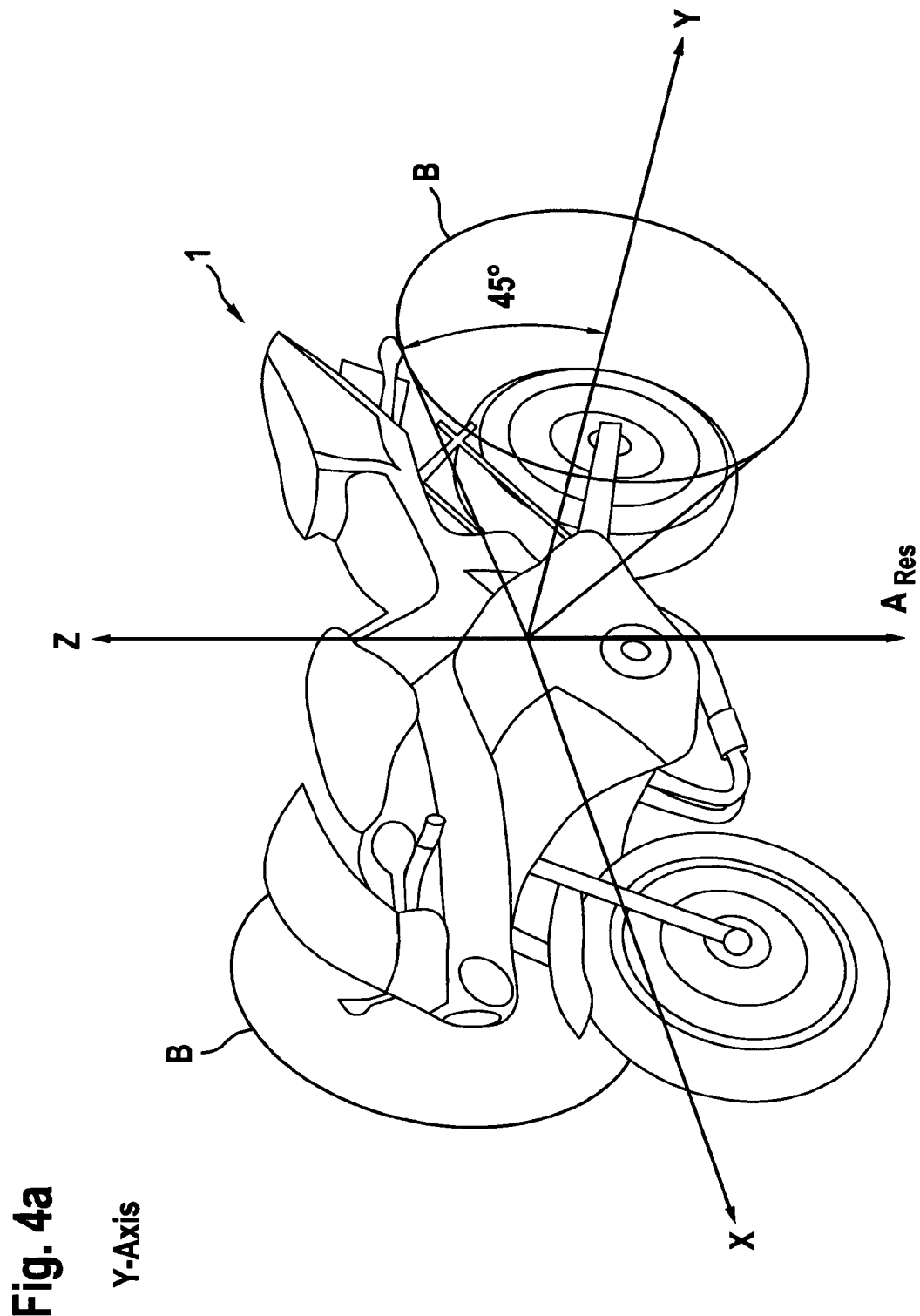
FIGS. 4a to 4d show examples of normal and critical vehicle positions.

FIG. 4a shows a motorcycle in a normal vehicle position with respect to the Y axis and with respect to a vehicle coordinate system, placed substantially at the center of gravity of the motorcycle, having an X axis, a Y axis, and a Z axis. The resulting acceleration datum $A_{Res}$ points vertically downward, i.e., substantially in the direction of the force of gravity. The motorcycle is thus in a normal vehicle position in accordance with the present invention. The pyramidal cones around the Y axis show schematic regions that allow a critical vehicle position to be inferred if the resulting acceleration datum $A_{Res}$ were to fall into one of those regions. This would be the case, for example, if the motorcycle were tipped sideways.

In the variant depicted, the angle between the Y axis and the outer wall of the pyramidal cone is, for example, 45°. The value can depend on physical circumstances or on empirical investigations.

Figure 4B:
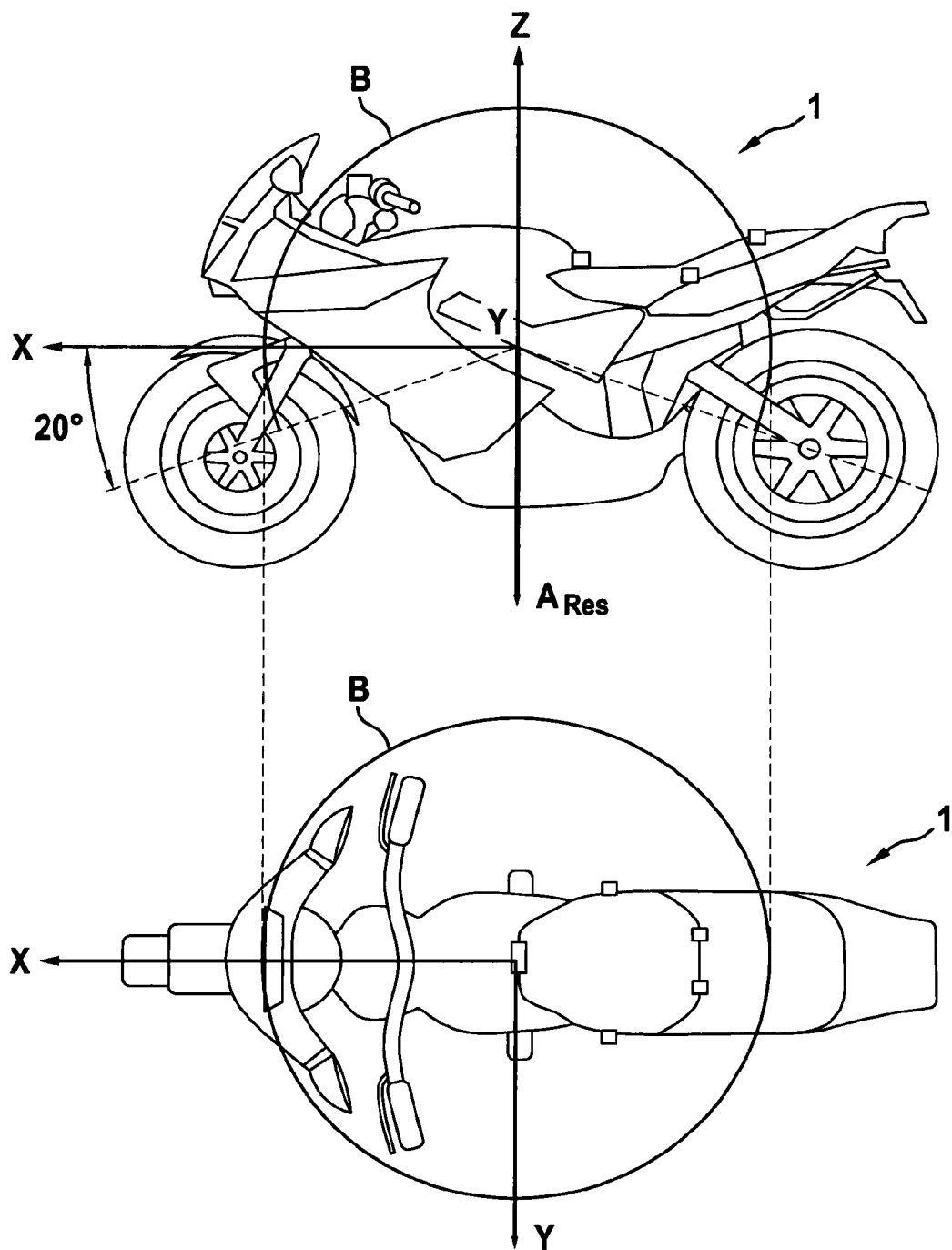

FIG. 4b shows a motorcycle in a normal vehicle position with respect to the Z axis, looking at the plane spanned by the X axis and the Z axis and at the plane spanned by the X axis and the Y axis. The resulting acceleration datum $A_{Res}$ points vertically downward, i.e., substantially in the direction of the force of gravity. The motorcycle is thus in a normal vehicle position in accordance with the present invention. The regions depicted show regions that allow a critical vehicle position to be inferred if the resulting acceleration datum $A_{Res}$ were to fall into one of those regions. These regions are entered, for example, when the motorcycle experiences a so-called "wheelie," i.e., rapid acceleration with liftoff of the front wheel, or a so-called "stoppie," i.e., strong deceleration with liftoff of the rear wheel.

In the variant depicted, the region covers, with reference to the X-Z plane, a circular segment that begins at an angle of 20° below the X axis and extends substantially to 20° below the X axis.

Figure 4C:
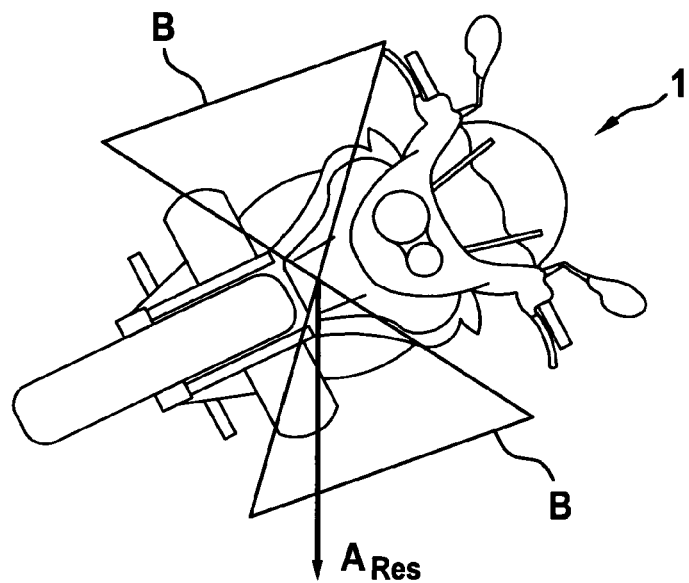

FIG. 4c shows a motorcycle in a critical vehicle position with reference to the Y axis. In the position depicted, the motorcycle is tipped to the side. The resulting acceleration datum $A_{Res}$ falls into the region that indicates a critical vehicle position.

Figure 4D:
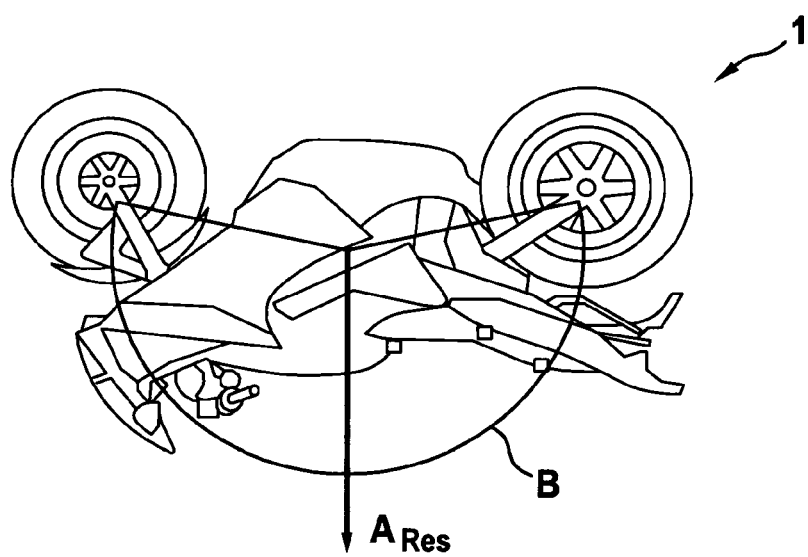

FIG. 4d shows a motorcycle in an implausible position and thus a critical vehicle position with reference to the Z axis. In the position depicted, the motorcycle has come to a stop on the handlebars and the seat. The resulting acceleration datum $A_{Res}$ falls into the region that indicates a critical vehicle position.

What is claimed is:

1. A method for monitoring a motorcycle, comprising the following steps:
   - detecting and analyzing acceleration-relevant data of the motorcycle;
   - based on the acceleration-relevant data and/or on variables ascertained from the acceleration-relevant data, estimating a vehicle motion and a current vehicle position in three-dimensional space, wherein the acceleration-relevant data is detected using a sensor unit of the motorcycle;
   - analyzing the current estimated vehicle position in space and evaluating the current estimated vehicle position as a normal riding state or a critical riding state, wherein a detection direction of the sensor unit of the motorcycle is predefined in such a way that in an upright normal resting position of the motorcycle: (i) the detection direction lies in a horizontal plane, and (ii) the detected acceleration-relevant data encompasses a first acceleration component in a longitudinal vehicle direction in the horizontal plane and a second acceleration component in a transverse vehicle direction in the horizontal plane, wherein the current estimated vehicle position in space is evaluated as a normal riding state when the vehicle position lies within a defined region, and is evaluated as a critical riding state when the vehicle position lies outside the defined region;

based on a riding state of the motorcycle being evaluated as a critical riding state, plausibilizing the riding state with the estimated vehicle motion to recognize a critical resting position after an accident; and generating an emergency call based on a critical resting position after an accident being recognized.

2. The method as recited in claim 1, wherein the critical resting position after an accident is inferred when no change in the vehicle motion is detected in the context of a time-related threshold value consideration over a defined time period.

3. The method as recited in claim 1, wherein an existence of a collision is assessed based on the acceleration-relevant data and/or on the variables ascertained from the acceleration-relevant data.

4. The method as recited in claim 3, wherein the existence of a collision is inferred, and the emergency call is generated, when the acceleration-relevant data and/or variables ascertained from the acceleration-relevant data exceed a predefined threshold value in the context of a time-related threshold value consideration over a defined time period.

5. The method as recited in claim 1, wherein a second detection direction of the sensor unit is predefined in such a way that in the upright normal resting position of the motorcycle, the second detection direction encompasses a third acceleration component in a vertical vehicle direction which is orthogonal to both the longitudinal vehicle direction and the transverse vehicle direction, and wherein the acceleration-relevant data further includes the third acceleration component.

6. The method as recited in claim 5, wherein the sensor unit includes only one acceleration sensor configured to detect the acceleration-relevant data including the first acceleration component, the second acceleration component, and the third acceleration component.

7. An apparatus for monitoring a motorcycle, the apparatus comprising:
a sensor unit configured to detect acceleration-relevant data of the motorcycle; and
an analysis and control unit, the sensor unit configured to output the acceleration-relevant data to the analysis and control unit, the analysis and control unit configured to analyze the acceleration-relevant data, and ascertain and evaluate a current riding state of the motorcycle, wherein the analysis and control unit is configured to:
based on the acceleration-relevant data and/or on variables ascertained from the acceleration-relevant data, estimate a vehicle motion and a current vehicle position in three-dimensional space,
analyze the current estimated vehicle position in space and evaluating the current estimated vehicle position as a normal riding state or a critical riding state, wherein a detection direction of the sensor unit of the motorcycle is predefined in such a way that in an upright normal resting position of the motorcycle: (i) the detection direction lies in a horizontal plane, and (ii) the detected acceleration-relevant data encompasses a first acceleration component in a longitudinal vehicle direction in the horizontal plane and a second acceleration component in a transverse vehicle direction in the horizontal plane, wherein the current estimated vehicle position in space is evaluated as a normal riding state when the vehicle position lies within a defined region, and is evaluated as a critical riding state when the vehicle position lies outside the defined region, based on a riding state of the motorcycle being evaluated as a critical riding state, plausibilize the riding state with the estimated vehicle motion to recognize a critical resting position after an accident, and
generate an emergency call based on a critical resting position after an accident being recognized.

8. The apparatus as recited in claim 7, wherein the analysis and control unit generates the emergency call and transmits the emergency call via a communication unit.

9. The apparatus as recited in claim 7, wherein the analysis and control unit includes a state estimator configured to estimate the vehicle position in three-dimensional space and/or estimate the vehicle motion and/or existence of a collision.

10. The apparatus as recited in claim 7, wherein the analysis and control unit filters the acceleration-relevant data through at least one filter unit, and ascertains the further variables.

11. The apparatus as recited in claim 7, wherein a second detection direction of the sensor unit is predefined in such a way that in the upright normal resting position of the motorcycle, the second detection direction encompasses a third acceleration component in a vertical vehicle direction which is orthogonal to both the longitudinal vehicle direction and the transverse vehicle direction, and wherein the acceleration-relevant data further includes the third acceleration component.

12. The apparatus method as recited in claim 11, wherein the sensor unit includes only one acceleration sensor configured to detect the acceleration-relevant data including the first acceleration component, the second acceleration component, and the third acceleration component.

13. A motorcycle, comprising:
an apparatus configured to monitor the motorcycle, the apparatus including:
a sensor unit configured to detect acceleration-relevant data of the motorcycle; and
an analysis and control unit, the sensor unit configured to output the acceleration-relevant data to the analysis and control unit, the analysis and control unit configured to analyze the acceleration-relevant data, and ascertain and evaluate a current riding state of the motorcycle, wherein the analysis and control unit is configured to:
based on the acceleration-relevant data and/or on variables ascertained from the acceleration-relevant data, estimate a vehicle motion and a current vehicle position in three-dimensional space,
analyze the current estimated vehicle position in space and evaluating the current estimated vehicle position as a normal riding state or a critical riding state, wherein a detection direction of the sensor unit of the motorcycle is predefined in such a way that in an upright normal resting position of the motorcycle: (i) the detection direction lies in a horizontal plane, and (ii) the detected acceleration-relevant data encompasses a first acceleration component in a longitudinal vehicle direction in the horizontal plane and a second acceleration component in a transverse vehicle direction in the horizontal plane, wherein the current estimated vehicle position in space is evaluated as a normal riding state when the vehicle position lies within a defined region, and is evaluated as a critical riding state when the vehicle position lies outside the defined region, based on a riding state of the motorcycle being evaluated as a critical riding state, plausibilize the riding state with the estimated vehicle motion to recognize a critical resting position after an accident, and generate an emergency call based on a critical resting position after an accident being recognized; and an emergency call apparatus configured to transmit the emergency call generated by the analysis and control unit.

14. A non-transitory machine-readable memory medium on which is stored a computer program for monitoring a motorcycle, the computer program, when executed by a computer, causing the computer to perform the following steps:

detecting and analyzing acceleration-relevant data of the motorcycle;

based on the acceleration-relevant data and/or on variables ascertained from the acceleration-relevant data, estimating a vehicle motion and a current vehicle position in three-dimensional space, wherein the acceleration-relevant data is detected using a sensor unit of the motorcycle;

analyzing the current estimated vehicle position in space and evaluating the current estimated vehicle position as a normal riding state or a critical riding state, wherein a detection direction of the sensor unit of the motorcycle is predefined in such a way that in an upright normal resting position of the motorcycle: (i) the detection direction lies in a horizontal plane, and (ii) the detected acceleration-relevant data encompasses a first acceleration component in a longitudinal vehicle direction in the horizontal plane and a second acceleration component in a transverse vehicle direction in the horizontal plane, wherein the current estimated vehicle position in space is evaluated as a normal riding state when the vehicle position lies within a defined region, and is evaluated as a critical riding state when the vehicle position lies outside the defined region;

based on a riding state of the motorcycle being evaluated as a critical riding state, plausibilizing the riding state with the estimated vehicle motion to recognize a critical resting position after an accident; and generating an emergency call based on a critical resting position after an accident being recognized.

* * * * *